US011399064B2

(12) United States Patent
Guo et al.

(10) Patent No.: US 11,399,064 B2
(45) Date of Patent: Jul. 26, 2022

(54) PEAK CYCLICAL WORKLOAD-BASED STORAGE MANAGEMENT IN A MULTI-TIER STORAGE ENVIRONMENT

(71) Applicant: International Business Machines Corporation, Armonk, NY (US)

(72) Inventors: Yong Guo, Shanghai (CN); Kaisar R. Hossain, Tucson, AZ (US); Jun Tao Li, Shanghai (CN); Yan Xu, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 287 days.

(21) Appl. No.: 16/547,431

(22) Filed: Aug. 21, 2019

(65) Prior Publication Data

US 2019/0379738 A1 Dec. 12, 2019

Related U.S. Application Data

(63) Continuation of application No. 14/274,363, filed on May 9, 2014, now Pat. No. 10,484,470.

(51) Int. Cl.
*H04L 67/1097* (2022.01)
*H04L 67/1008* (2022.01)
*H04L 67/101* (2022.01)

(52) U.S. Cl.
CPC ........ *H04L 67/1097* (2013.01); *H04L 67/101* (2013.01); *H04L 67/1008* (2013.01)

(58) Field of Classification Search
CPC .............. H04L 67/1097; H04L 67/101; H04L 67/1008
USPC ....................................................... 709/226
See application file for complete search history.

(56) References Cited

U.S. PATENT DOCUMENTS

| 7,467,329 | B1 | 12/2008 | Keeton et al. |
| 8,386,995 | B2 | 2/2013 | Coleman et al. |
| 8,504,556 | B1 | 8/2013 | Rice et al. |
| 10,484,470 | B2 | 11/2019 | Guo et al. |
| 2003/0212872 | A1* | 11/2003 | Patterson .............. G06F 3/0601 711/165 |
| 2005/0267929 | A1 | 12/2005 | Kitamura |

(Continued)

OTHER PUBLICATIONS

A. Roy, R. Ganesan, D. Dash, and S. Sarkar, "Reducing service failures by failure and workload aware load balancing in saas clouds," in Proc. DSN Workshops (RSDA). IEEE, 2013. (Year: 2013).*
List of IBM Patents or Patent Applications Treated as Related.
Guo et al., U.S. Appl. No. 14/274,363, filed May 9, 2014.
Appleby et al., "Using Automatically Derived Load Thresholds to Manage Compute Resources On-Demand," Threshold Management, Session Sixteen, IEEE, 2005, pp. 747-760.

(Continued)

*Primary Examiner* — Meng Vang
(74) *Attorney, Agent, or Firm* — Zilka-Kotab, P.C.

(57) ABSTRACT

In one embodiment, a method for managing data includes collecting workload information for a data storage device in a data storage system over a period of time. A peak workload of the data storage device for the period of time is determined. A maximum workload threshold for the data storage device in the data storage system over the period of time is also determined. Movement of additional workload to the device in the data storage system is prevented during a subsequent period of time when the data storage device is predicted to be at about the peak workload for the data storage device in response to a determination that adding the additional workload would cause the workload of the device to exceed the maximum workload threshold.

20 Claims, 8 Drawing Sheets

(56) References Cited

U.S. PATENT DOCUMENTS

| | | |
|---|---|---|
| 2007/0250838 A1 | 10/2007 | Belady et al. |
| 2008/0271038 A1 | 10/2008 | Rolia et al. |
| 2009/0228589 A1* | 9/2009 | Korupolu ............ H04L 67/1002 709/226 |
| 2010/0107013 A1 | 4/2010 | Mopur et al. |
| 2010/0169253 A1 | 7/2010 | Tan |
| 2010/0332657 A1* | 12/2010 | Elyashev ............ H04L 67/1002 709/226 |
| 2011/0093413 A1 | 4/2011 | Calcaterra et al. |
| 2012/0203999 A1* | 8/2012 | Jess ....................... G06F 3/0665 711/173 |
| 2012/0265881 A1 | 10/2012 | Chen et al. |
| 2013/0111172 A1 | 5/2013 | Gao et al. |
| 2013/0232270 A1 | 9/2013 | Chiu et al. |
| 2013/0332614 A1 | 12/2013 | Brunk et al. |
| 2014/0269275 A1* | 9/2014 | Jun ......................... H04W 8/02 370/230 |
| 2015/0200833 A1* | 7/2015 | Cutforth ............... G06F 3/0647 709/224 |
| 2015/0326656 A1 | 11/2015 | Guo et al. |

OTHER PUBLICATIONS

Non-Final Office Action from U.S. Appl. No. 14/274,363, dated Oct. 22, 2015.
Final Office Action from U.S. Appl. No. 14/274,363, dated May 18, 2016.
Non-Final Office Action from U.S. Appl. No. 14/274,363, dated Jan. 17, 2017.
Roy et al., "Reducing serVIce failures by failure and workload aware load balancing in SaaS clouds," Proceedings of DSN Workshops (RSDA), IEEE, 2013, pp. 1-6.
Final Office Action from U.S. Appl. No. 14/274,363, dated Jul. 24, 2017.
Examiner's Answer to Appeal Brief from U.S. Appl. No. 14/274,363, dated May 18, 2018.
Patent Board Decision on Appeal from U.S. Appl. No. 14/274,363, dated Apr. 26, 2019.
Notice of Allowance from U.S. Appl. No. 14/274,363, dated Jul. 3, 2019.
Corrected Notice of Allowance from U.S. Appl. No. 14/274,363, dated Oct. 16, 2019.

* cited by examiner

PEAK CYCLICAL WORKLOAD-BASED STORAGE MANAGEMENT IN A MULTI-TIER STORAGE ENVIRONMENT

BACKGROUND

The present invention relates to management of a multi-tier storage environment, and more specifically, this invention relates to managing data storage based on peak cyclical workloads in a multi-tier storage environment.

A file system defines how files are named and manages how they are placed for storage and retrieval. File system functionality may be divided into two components: a user component and a storage component. The user component is responsible for managing files within directories, file path traversals, and user access to files. The storage component of the file system determines how files are stored physically on the storage device.

In addition, a file system may attempt to efficiently place data in different locations according to the importance of the data and how frequently it is accessed. When a storage system has more than one tier of data storage (e.g., a multi-tier storage system), the placement of the data within these tiers has a dramatic effect on the accessibility of that data. Data placed on a higher tier is more readily and quickly accessible than data placed on a lower tier. This is generally due to the performance capabilities of the data storage devices used in the higher and lower tiers. A multi-tier storage system with automatic data placement management, such as IBM's Easy Tier can automatically place data in its corresponding tier based on its access pattern. The current invention applies to a multi-tier storage system with automatic data placement management.

In an attempt to manage the resources of a multi-tier storage system, sometimes data associated with a workload is moved to a high tier during a cyclical downtime, such as on the weekends, because its demand relative to other data is high due to the long term time view used to determine a workload's demand. However, by moving workloads to the higher tier during downtimes, some individual storage devices may become overloaded or overdriven once the downtime ends, such as at the start of a work week (e.g., Monday). This is because after the downtime, workloads requiring highly demanded data ("hot" data) will once again be recognized as needing to be placed on the higher tier due to their demand relative to other workloads, but since the higher tier has been populated with workloads during the downtime, overall performance of the multi-tier storage system may be negatively affected.

SUMMARY

In one embodiment, a method for managing data includes collecting workload information for a data storage device in a data storage system over a period of time. A peak workload of the data storage device for the period of time is determined. A maximum workload threshold for the data storage device in the data storage system over the period of time is also determined. Movement of additional workload to the device in the data storage system is prevented during a subsequent period of time when the data storage device is predicted to be at about the peak workload for the data storage device in response to a determination that adding the additional workload would cause the workload of the device to exceed the maximum workload threshold.

In another embodiment, a system includes a processor and logic integrated with and/or executable by the processor, the logic being configured to cause the processor to perform the foregoing method.

According to yet another embodiment, a computer program product for managing data includes a computer readable storage medium having program code embodied therewith, the program code executable by a processor to cause the processor to perform the foregoing method.

Other aspects and embodiments of the present invention will become apparent from the following detailed description, which, when taken in conjunction with the drawings, illustrate by way of example the principles of the invention.

DETAILED DESCRIPTION

Figure 1:
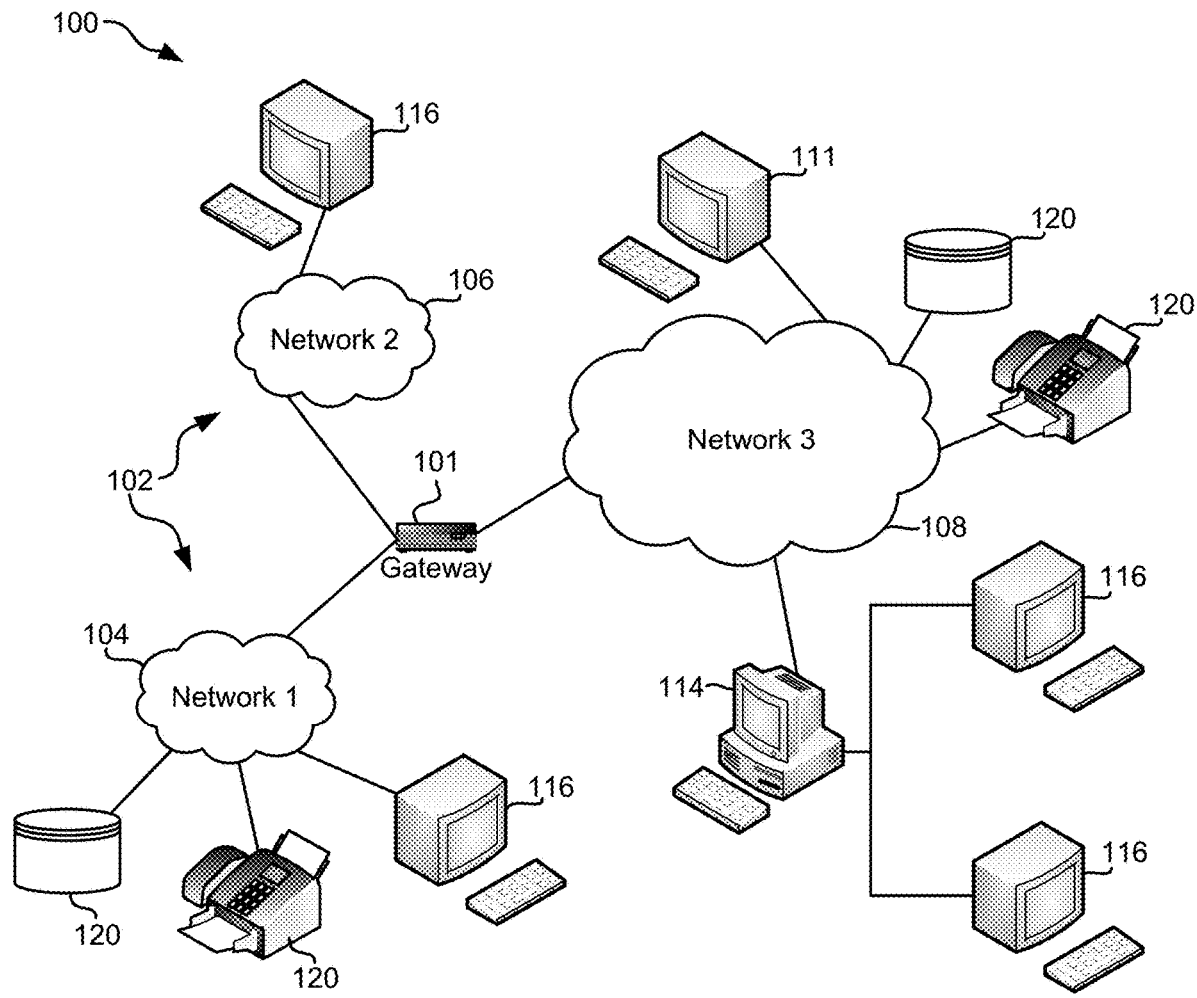
FIG. 1 illustrates a network architecture, in accordance with one embodiment.

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an," and "the" include plural referents unless otherwise specified. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The following description discloses several preferred embodiments of systems, methods, and computer program products for efficient management of a multi-tiered storage system, particularly with regard to workload management during downtimes.

In one general embodiment, a method for managing data includes collecting workload information for one or more computing/storage devices in a tiered data storage system over a period of time, determining a peak workload for the period of time on a per rank basis, determining a maximum workload threshold for the one or more computing/storage devices in the tiered data storage system over the period of time, and preventing movement of additional workload to the one or more computing/storage devices in the tiered data storage system over the period of time when adding the additional workload to the peak workload causes overload of the one or more computing/storage devices in the tiered data storage system.

In another general embodiment, a system includes a processor and logic integrated with and/or executable by the processor, the logic being configured to cause the processor to: collect, by the processor, workload information for a computing/storage device for a present time period and one or more previous time periods; determine, by the processor, a maximum workload parameter for the present time period and the one or more previous time periods; determine, by the processor, a maximum workload threshold that corresponds to the maximum workload parameter; compute, by the processor, a difference between the maximum workload threshold and the maximum workload parameter; and determine, by the processor, an amount of workload to move to the computing/storage device based on the difference.

According to yet another general embodiment, a computer program product for managing data includes a computer readable storage medium having program code embodied therewith, the program code executable by a processor to cause the processor to: collect workload information for a computing/storage device for a present time period and one or more previous time periods, determine a maximum workload parameter for the present time period and the one or more previous time periods, determine a maximum workload threshold that corresponds to the maximum workload parameter, compute a difference between the maximum workload threshold and the maximum workload parameter, and determine an amount of workload to move to the computing/storage device based on the difference.

FIG. 1 illustrates an architecture 100, in accordance with one embodiment. As shown in FIG. 1, a plurality of remote networks 102 are provided including a first remote network 104 and a second remote network 106. A gateway 101 may be coupled between the remote networks 102 and a proximate network 108. In the context of the present architecture 100, the networks 104, 106 may each take any form including, but not limited to a LAN, a WAN such as the Internet, public switched telephone network (PSTN), internal telephone network, etc.

In use, the gateway 101 serves as an entrance point from the remote networks 102 to the proximate network 108. As such, the gateway 101 may function as a router, which is capable of directing a given packet of data that arrives at the gateway 101, and a switch, which furnishes the actual path in and out of the gateway 101 for a given packet.

Further included is at least one data server 114 coupled to the proximate network 108, and which is accessible from the remote networks 102 via the gateway 101. It should be noted that the data server(s) 114 may include any type of computing device/groupware. Coupled to each data server 114 is a plurality of user devices 116. Such user devices 116 may include a desktop computer, lap-top computer, hand-held computer, printer or any other type of logic. It should be noted that a user device 111 may also be directly coupled to any of the networks, in one embodiment.

A peripheral 120 or series of peripherals 120, e.g., facsimile machines, printers, networked and/or local storage units or systems, etc., may be coupled to one or more of the networks 104, 106, 108. It should be noted that databases and/or additional components may be utilized with, or integrated into, any type of network element coupled to the networks 104, 106, 108. In the context of the present description, a network element may refer to any component of a network.

According to some approaches, methods and systems described herein may be implemented with and/or on virtual systems and/or systems which emulate one or more other systems, such as a UNIX system which emulates an IBM z/OS environment, a UNIX system which virtually hosts a MICROSOFT WINDOWS environment, a MICROSOFT WINDOWS system which emulates an IBM z/OS environment, etc. This virtualization and/or emulation may be enhanced through the use of VMWARE software, in some embodiments.

In more approaches, one or more networks 104, 106, 108, may represent a cluster of systems commonly referred to as a "cloud." In cloud computing, shared resources, such as processing power, peripherals, software, data, servers, etc., are provided to any system in the cloud in an on-demand relationship, thereby allowing access and distribution of services across many computing systems. Cloud computing typically involves an Internet connection between the systems operating in the cloud, but other techniques of connecting the systems may also be used.

Figure 2:
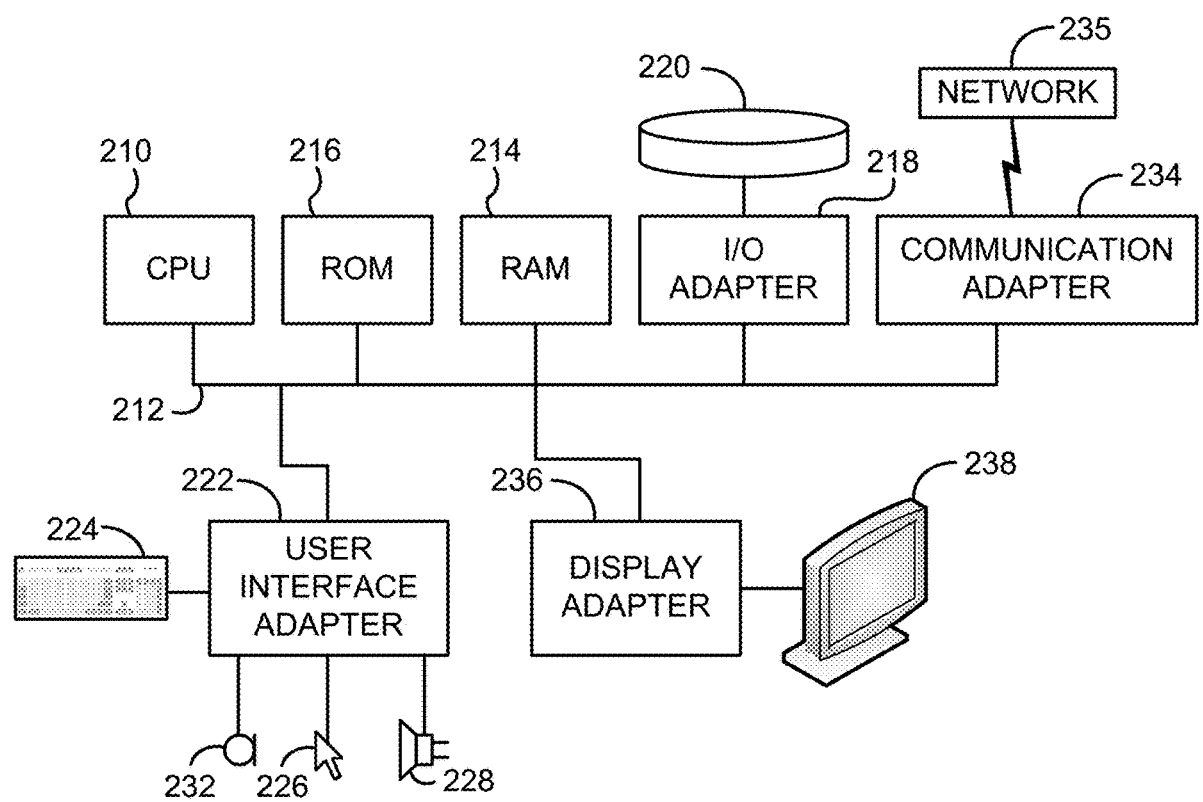
FIG. 2 shows a representative hardware environment that may be associated with the servers and/or clients of FIG. 1, in accordance with one embodiment.

FIG. 2 shows a representative hardware environment associated with a user device 116 and/or server 114 of FIG. 1, in accordance with one embodiment. Such figure illustrates a typical hardware configuration of a workstation having a central processing unit 210, such as a microprocessor, and a number of other units interconnected via a system bus 212.

The workstation shown in FIG. 2 includes a Random Access Memory (RAM) 214, Read Only Memory (ROM) 216, an I/O adapter 218 for connecting peripheral devices such as disk storage units 220 to the bus 212, a user interface adapter 222 for connecting a keyboard 224, a mouse 226, a speaker 228, a microphone 232, and/or other user interface devices such as a touch screen and a digital camera (not shown) to the bus 212, communication adapter 234 for connecting the workstation to a communication network 235 (e.g., a data processing network) and a display adapter 236 for connecting the bus 212 to a display device 238.

The workstation may have resident thereon an operating system such as the Microsoft Windows® Operating System (OS), a MAC OS, a UNIX OS, etc. It will be appreciated that a preferred embodiment may also be implemented on platforms and operating systems other than those mentioned. A preferred embodiment may be written using JAVA, XML, C, and/or C++ language, or other programming languages, along with an object oriented programming methodology. Object oriented programming (OOP), which has become increasingly used to develop complex applications, may be used.

Figure 3:
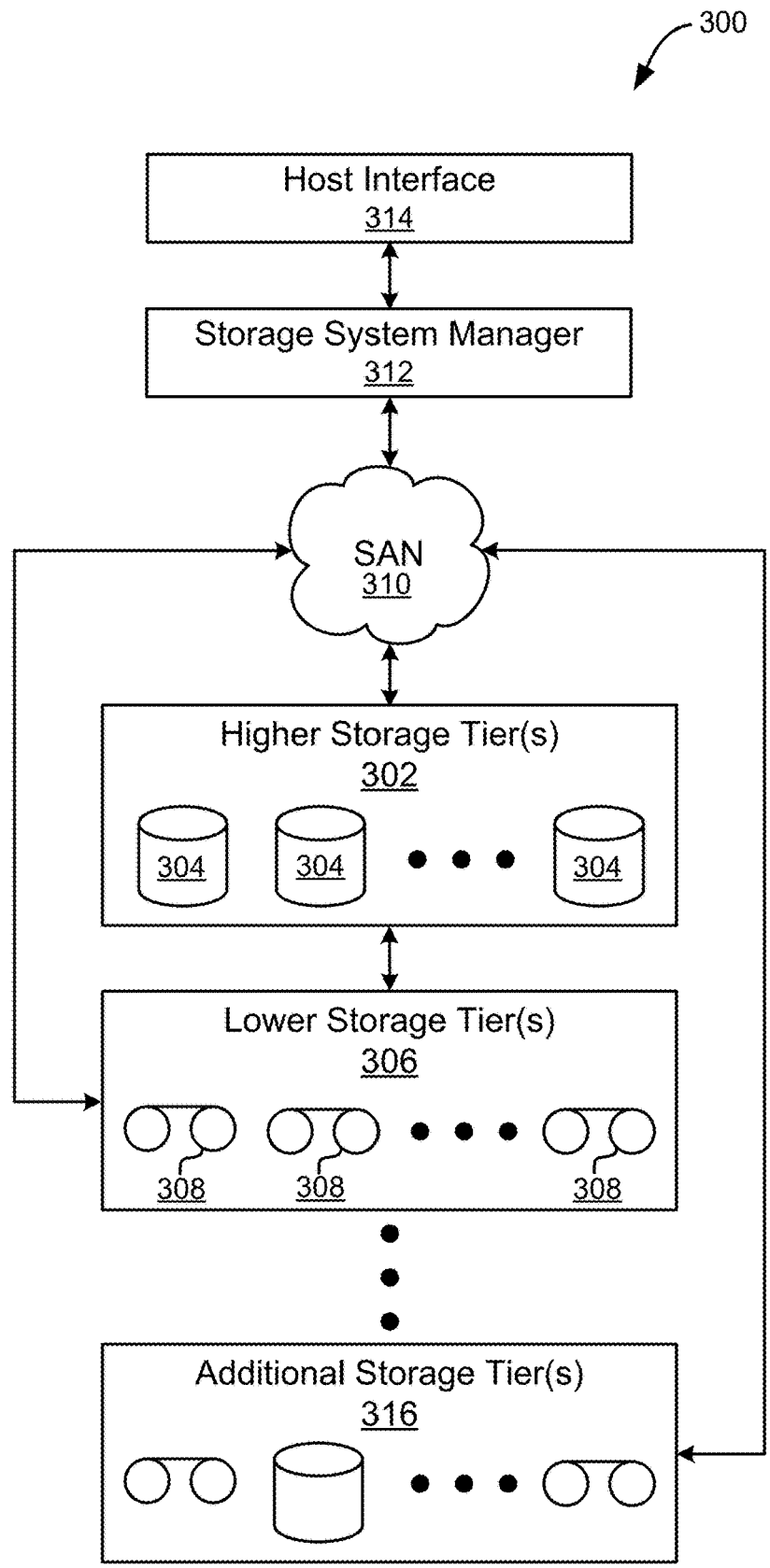
FIG. 3 illustrates a tiered data storage system in accordance with one embodiment.

Now referring to FIG. 3, a storage system 300 is shown according to one embodiment. Note that some of the elements shown in FIG. 3 may be implemented as hardware and/or software, according to various embodiments. The storage system 300 may include a storage system manager 312 for communicating with a plurality of media on at least one higher storage tier 302 and at least one lower storage tier 306. The higher storage tier(s) 302 preferably may include one or more random access and/or direct access media 304, such as hard disks in hard disk drives (HDDs), nonvolatile memory (NVM), solid state memory in solid state drives (SSDs), flash memory, SSD arrays, flash memory arrays, etc., and/or others noted herein or known in the art. The lower storage tier(s) 306 may preferably include one or more lower performing storage media 308, including slower accessing HDDs, sequential access media such as magnetic tape in tape drives and/or optical media, etc., and/or others noted herein or known in the art. One or more additional storage tiers 316 may include any combination of storage memory media as desired by a designer of the system 300. Also, any of the higher storage tiers 302 and/or the lower storage tiers 306 may include some combination of storage devices and/or storage media.

The storage system manager 312 may communicate with the storage media 304, 308 on the higher storage tier(s) 302 and lower storage tier(s) 306 through a network 310, such as a storage area network (SAN), as shown in FIG. 3, or some other suitable network type. The storage system manager 312 may also communicate with one or more host systems (not shown) through a host interface 314, which may or may not be a part of the storage system manager 312. The storage system manager 312 and/or any other component of the storage system 300 may be implemented in hardware and/or software, and may make use of a processor (not shown) for executing commands of a type known in the art, such as a central processing unit (CPU), a field programmable gate array (FPGA), an application specific integrated circuit (ASIC), etc. Of course, any arrangement of a storage system may be used, as will be apparent to those of skill in the art upon reading the present description.

In more embodiments, the storage system 300 may include any number of data storage tiers, and may include the same or different storage memory media within each storage tier. For example, each data storage tier may include the same type of storage memory media, such as HDDs, SSDs, sequential access media (tape in tape drives, optical disk in optical disk drives, etc.), direct access media (CD-ROM, DVD-ROM, etc.), or some predetermined combination of media storage types. In one such configuration, a higher storage tier 302, may include a majority of SSD storage media (up to and including all SSD storage media) for storing data in a higher performing storage environment, and remaining storage tiers, including lower storage tier 306 and additional storage tiers 316 may include any combination of SSDs, HDDs, tape drives, etc., for storing data in a lower performing storage environment. In this way, more frequently accessed data, data having a higher priority, data needing to be accessed more quickly, etc., may be stored to the higher storage tier 302, while data not having one of these attributes may be stored to the additional storage tiers 316, including lower storage tier 306. Of course, one of skill in the art, upon reading the present descriptions, may devise many other combinations of storage media types to implement into different storage schemes, according to the embodiments presented herein.

In one particular embodiment, the storage system 300 may include a combination of SSDs and HDDs, with the higher storage tier 302 including SSDs (and possibly some buffer memory) and the lower storage tier 306 including HDDs (and possibly some buffer memory). According to another embodiment, the storage system 300 may include a combination of SSDs and magnetic tape, with the higher storage tier 302 including SSDs (and possibly some buffer memory) and the lower storage tier 306 including magnetic tape (and possibly some buffer memory). In yet another embodiment, the storage system 300 may include a combination of HDDs and magnetic tape, with the higher storage tier 302 including HDDs (and possibly some buffer memory) and the lower storage tier 306 including magnetic tape (and possibly some buffer memory).

According to some embodiments, the storage system manager 312 may include logic configured to receive a request to open a data set, logic configured to determine if the requested data set is stored to a lower storage tier 306 of a tiered data storage system 300 in multiple associated portions, logic configured to move each associated portion of the requested data set to a higher storage tier 302 of the tiered data storage system 300, and logic configured to assemble the requested data set on the higher storage tier 302 of the tiered data storage system 300 from the associated portions.

Of course, this logic may be implemented as a method on any device and/or system or as a computer program product, according to various embodiments.

Figure 4:
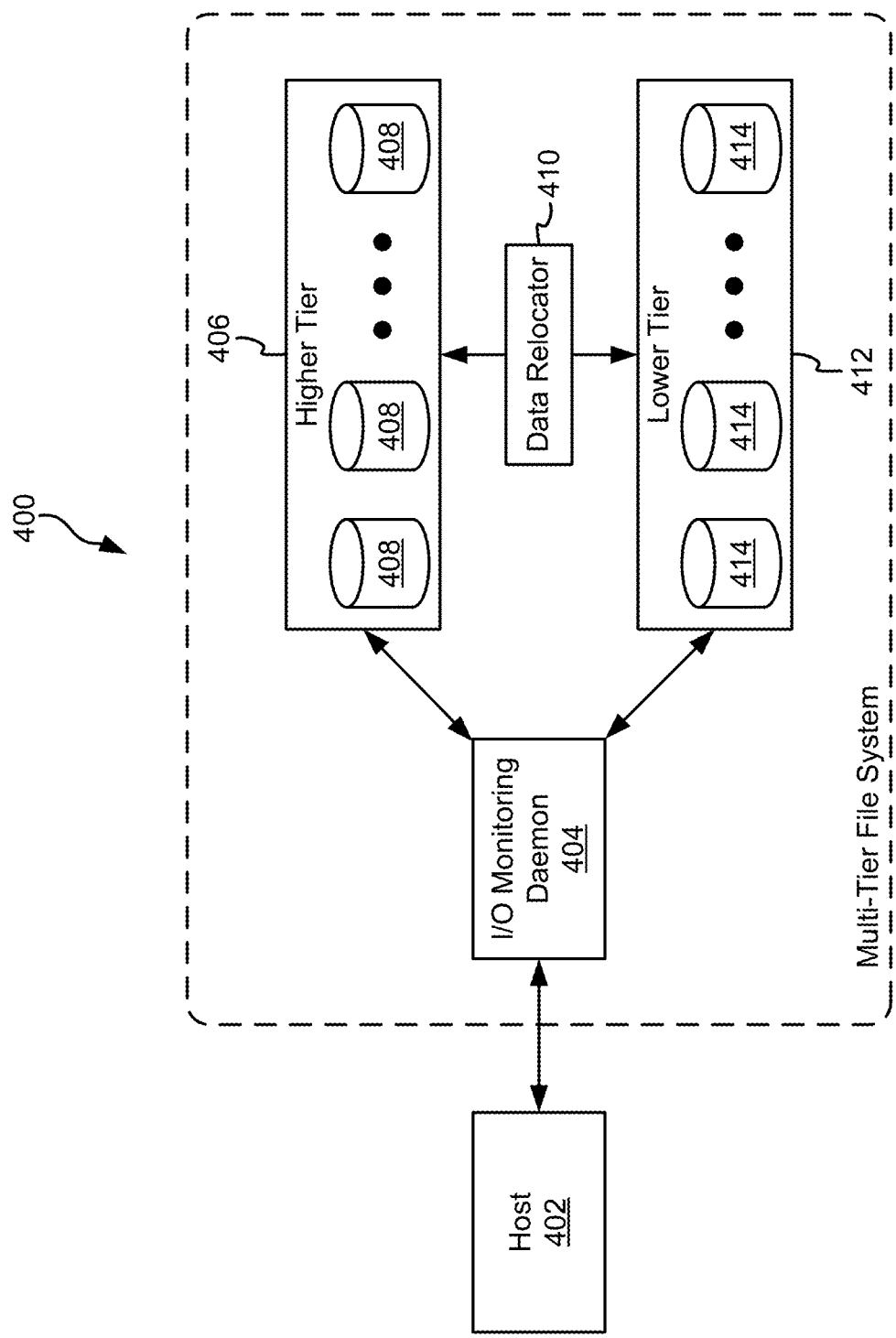
FIG. 4 shows a multi-tiered storage system according to another embodiment.

Now referring to FIG. 4, a multi-tier storage system 400 is shown according to one embodiment. The multi-tier storage system 400 includes at least one higher data tier 406 having higher performing storage media 408 therein and at least one lower data tier 412 having lower performing storage media 414 therein. By higher and lower performing, relatively speaking, the higher performing storage media 408 may have higher throughput, lower response times, I/O operations per second (IOPS)-energy-efficient characteristics, faster data access, easier searching capability, etc., while the lower performing storage media 414 may have lower throughput, higher response times, slower data access, harder to search and/or index, harder to access, etc. In one embodiment, data access times are lower for higher performing data storage while the cost for storing data is higher as compared to lower performing data storage.

In addition, the multi-tier storage system 400 includes an I/O monitoring daemon 404 which monitors for I/Os performed on storage devices and/or storage media that may be provided with the multi-tier storage system 400. This multi-tier storage system 400 may be based on an IBM Easy Tier (EZT) architecture or some other multi-tier storage system known in the art.

The multi-tier storage system 400 is configured to interface with a host 402, such that requests for data and data to be stored to the multi-tier storage system 400 are transmittable back and forth between the multi-tier storage system 400 and the host 402. The host 402 may be any system, application, file system, device, etc., that is configured to communicate with the multi-tier storage system 400. Based on data access frequency, the I/O monitoring daemon 404 identifies data that is heavily accessed and/or receives a great number of access requests ("hot"). The I/O monitoring daemon 404 also identifies data that is not heavily accessed and/or does not receive a great number of access requests ("cold"). A data relocator 410 is configured to relocate hot data to a higher data tier 406 in the multi-tier storage system 400 when the hot data is not already located on a highest of the higher data tier(s) 406. In addition, the data relocator 410 is configured to relocate cold data to a lower data tier 412 in the multi-tier storage system 400 when the cold data is not already located on a lowest of the lower data tier(s) 412. As a result, the amount of expensive storage required to meet a given level of performance is minimized compared to other methods of data placement for tiered storage.

IBM's Easy Tier (EZT) may be used as an example of a multi-tier storage system. EZT makes use of an exponential moving average (EMA) to calculate relative demand for workloads in the system. The EMA of workload demand is similar to a simple moving average (SMA), except that more weight is given to more recent or the latest demand data. This allows the EMA to react more quickly than the SMA to changes in workload demand.

EMA demand calculations are used to determine whether data is "hot" (in high demand relative to other data), the determination is based on a long term view of workload demand. Based on EMA demand calculations, the multi-tier storage system may create data movement plans after a predetermined learning/decision period. In various embodiments, the learning/decision period may be about 12 hours, 18 hours, 24 hours, 48 hours, etc.

However, a workload's peak demand may be much higher than an average demand (which is used for demand calculations), and when the peak demand occurs after workloads are moved to the higher tier, the amount of workloads moved to a particular storage/computing device may overdrive the storage/computing device. This typically results in a negative performance adjustment for the workloads moved to the storage/computing device as too much workload has been moved into the storage/computing devices during the downtime when the workload on the storage/computing device is lower. In one embodiment, the peak workload of a storage device along with a corresponding performance threshold within a predefined learning/decision period may be used to determine if additional data may be moved into a target storage tier. The data may only be moved to the target tier when the sum of additional workload and peak workload of a target tier does not exceed the threshold of the target tier. A workload demand may be cyclical in regard to the decision period, for example, when the decision period is a day, the workload demand may be high during weekdays and low during the weekend. The peak workload demands during the weekend would be lower and the corresponding threshold would remain high, resulting in the multi-tier storage system moving more data to the higher performance tier. Then, unfortunately, when the next peak workload occurs after the downtime (such as on a Monday of a work week), the workload on the data moved to the higher performing storage/computing device during the downtime increases significantly, and the higher performing storage/computing device may become overloaded and cause performance to drop.

Any other multi-tier storage system which relies on EMA, SMA, and other known workload demand calculations, may also be improved with the systems, methods, and computer program products described herein according to various embodiments.

According to one embodiment, a storage device's peak workload along with a corresponding performance threshold is tracked over a previous, predetermined amount of time with a predetermined period. The predetermined amount of time may be a multiple of the learning/decision period. When the learning/decision period is one day, the predetermined amount of time may be one or several days, one or several weeks, one or several months, etc. The peak workload and corresponding performance threshold may be tracked over a predetermined period, such as on a day-to-day basis, week-to-week basis, month-to-month basis, etc. In one embodiment, the previous three days may be tracked on a day-to-day basis. In another embodiment, the previous three months may be tracked on a week-to-week basis. Of course, any other amount of time and period may be used to track the peak workload and corresponding performance threshold.

This tracking of previous data allows for decreases in workload to be identified and any cyclic nature thereof to be identified. For example, when the decrease in workload occurs consistently on weekends, holidays, beginning of quarters, vacations, etc., a future occurrence of one of these events can be expected to cause a similar decrease in workload.

By identifying these cyclical workload decreases, the multi-tier storage system, some component thereof, some external device, system, apparatus, application, or some other suitable operation, may detect the peak workload of the periods of time when there is not downtime more accurately and protect storage/computing devices from overload by moving too much workload into the storage/computing devices during the downtime, such that when the next peak workload arrives during the next period of time when there is not downtime (such as the next work week after a weekend, work days after a holiday, the month after a holiday month in a European country or some other location which provides for a majority of employees to be on vacation at once, etc.), performance degradation is avoided or eliminated due to more intelligent loading of the storage/computing devices during the downtime.

The methods described herein for managing workload balancing across tiers of a multi-tier storage system may be used in any environment where workload intensity has a certain discernible cyclical pattern. The amount of time (e.g., number of days, weeks, months, etc.) to monitor the peak workload intensity may be adjusted depending on the duration of the cycle.

Figure 5:
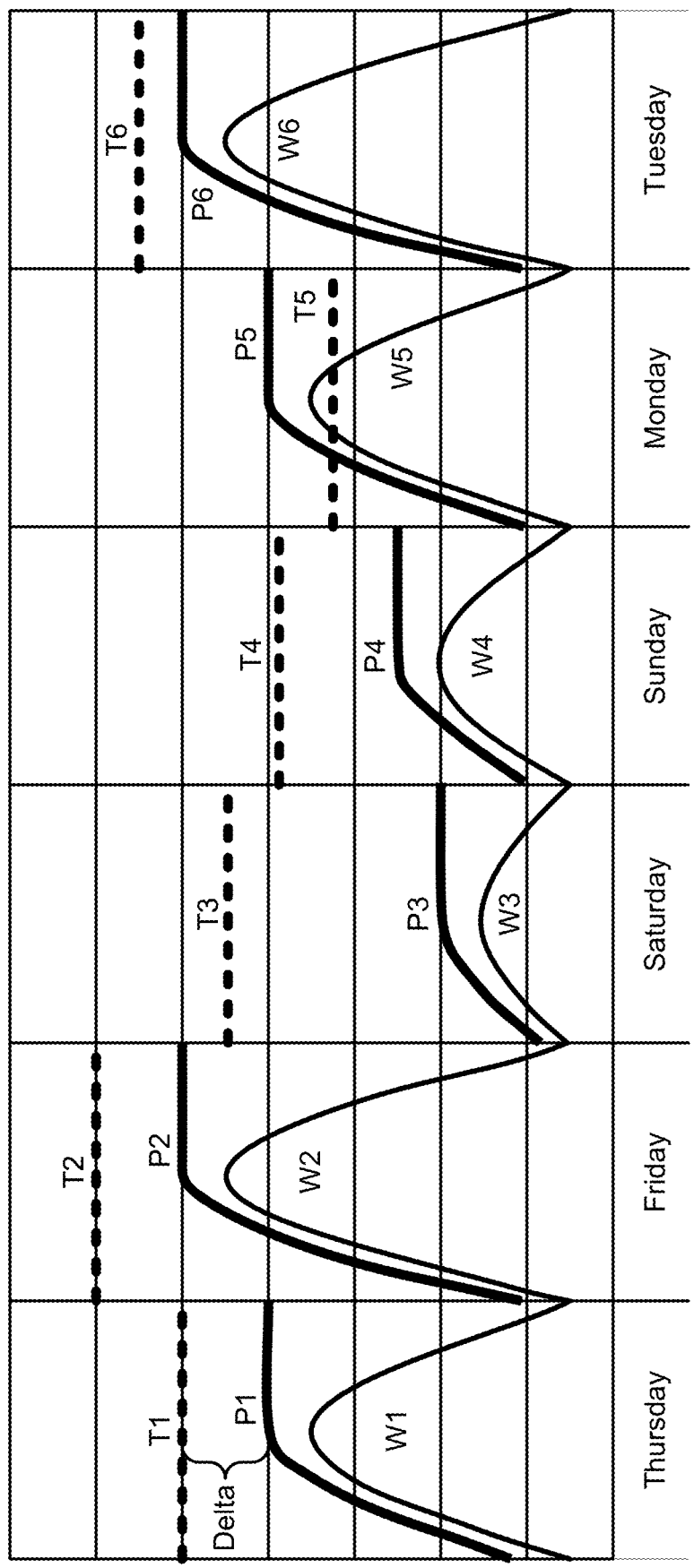
FIG. 5 shows a plot of workload balancing, in one example.

Now referring to FIG. 5, a graph is shown that illustrates problems that may be encountered when attempting to balance workloads across a multi-tier storage system when a downtime occurs. In this exemplary graph, workload, which is represented as data throughput in MB/sec, on the y-axis, is plotted against days of the week represented on the x-axis.

This graph is based on an exemplary multi-tier storage system that calculates a workload threshold (Tn) based on a setting by an administrator, some proportion of peak workloads (Pn) for the workloads (Wn) over a previous predetermined period of time, a corresponding workload threshold (Tn) for similar operating conditions, such as date, time, resources available, demand, etc., or some other suitable calculation method known in the art.

In one embodiment, the workload threshold (Tn) may be calculated based on a defined performance profile which is developed to account for device properties, and workload characteristics (e.g., I/O characteristics, such as I/O size, read and write ratios, etc.). The peak workload for Saturday (P3) and Sunday (P4) fell dramatically from the peak workload for Friday (P2), the workload threshold for Saturday (T3) and Sunday (T4) was dropped as well, but not in the same degree as the peak workload (Pn).

However the workload threshold (Tn) are set, when this scheme is used to balance workloads across the storage/computing devices and tiers during a downtime (such as a weekend on Saturday and Sunday), the workload threshold remain relatively high, but the peak workload (Pn) for each individual day is much lower. This results in a large difference or delta between the workload threshold (Tn) and the peak workload (Pn) for each downtime period (each weekend day). The multi-tier storage system is configured to efficiently manage capacity of the higher tiers, so when a large delta is present on a higher tier storage/computing device, the multi-tier storage system (such as EZT) moves hot data from other lower tier storage/computing devices to the storage/computing devices on the higher tier(s), referred to as promoting the data. This is an attempt to utilize the higher tier storage/computing devices more efficiently.

However, when the downtime ends (such as on Monday after the weekend), the higher tier storage/computing devices may become overloaded due to the increased workload promoted to the higher tier storage/computing devices, as shown by the workload threshold for Monday (T5) being less than the peak workload for Monday (P5). Accordingly, because of this overloaded situation, the performance of the higher tier storage/computing devices suffers, and some of the workload must be moved to lower tier storage/computing devices, referred to as demoting the workload(s). During this process, the performance of the higher tier storage/computing devices also suffers.

Figure 6:
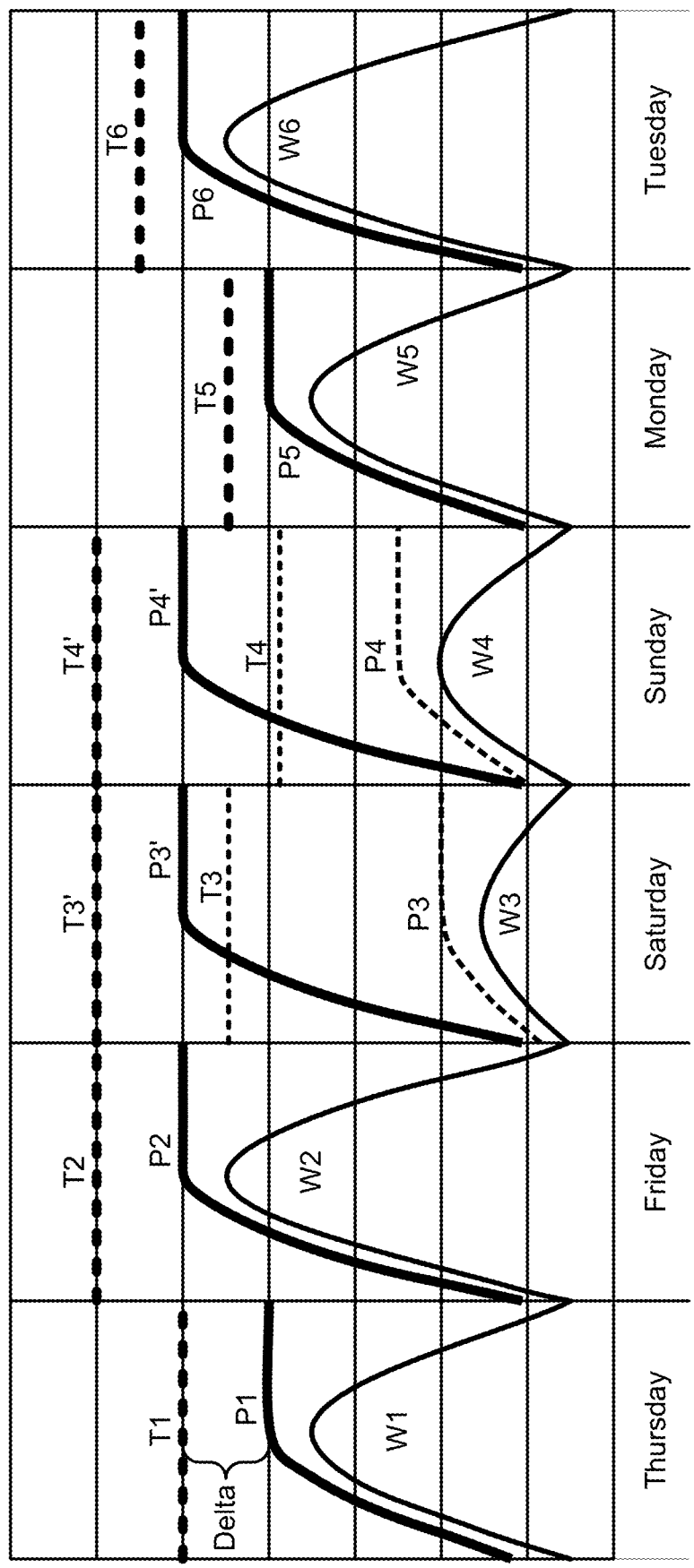
FIG. 6 shows a plot of workload balancing, in accordance with one embodiment.

In order to avoid this situation, a method may be employed as shown in FIG. 6. In this method, according to one embodiment, an amount of workload to move to a particular computing/storage device may be determined with respect to a workload threshold (Tn) and peak workload (Pn) that are calculated based on data from a present time period and one or more previous time periods.

As shown in FIG. 6, when the time period is 1 day, the present workload threshold (Tn) may be calculated based on a maximum of the peak workload from the present day and the two preceding days (three days total). This formula may be represented as Tn=Threshold(Max(Pn−2, Pn−1, Pn)). Once the peak workload for the corresponding day (either a previous day or the present day) is identified and the workload threshold (Tn) is calculated, these values are used in place of the present day's workload threshold and peak workload (except when the present day's peak workload and workload threshold are selected, in which case no changes occur). In this way, when downtime occurs (such as for the weekend, holidays, etc.), an excessive amount of workload is not moved to any of the available computing/storage devices based on their present peak workload being very low, because the calculation to determine an amount of workload to move to the particular computing/storage device is based on the selected workload threshold and peak workload, which will show a much smaller delta (Delta=Tn−Pn) than the delta which would be calculated for the present day's workload threshold and peak workload.

For example, the workload threshold for Saturday may be calculated as T3'=Threshold(Max(P1, P2, P3))=T2, because P2 is the maximum or greatest peak workload from the present day (Saturday) and two prior days (Thursday and Friday). Also, for any calculations to determine workload movement to a particular computing/storage device, the peak workload is represented by P3' which is equal to P2, instead of P3, which results in a much smaller delta.

Of course, the number of previous time periods with which to find the maximum peak workload may be altered to be more or less than three time periods, such as two time periods, four time periods, five time periods, etc. Also, the time period is not limited to being a day (24-hour period), but may instead be one or a number of hours, a multiple number of days, one or more months, one or more years, etc.

In another example, the workload threshold for Sunday may be calculated as T4'=Threshold(Max(P2, P3, P4))=T2, because P2 is still the maximum or greatest peak workload from the present day (Sunday) and two prior days (Saturday and Friday). Also, for any calculations to determine workload movement to a particular computing/storage device, the peak workload is represented by P4' for Sunday, which equals P2, instead of P4, which results in a much smaller delta and less workload movement. Then on Monday when workload spikes back up to normal levels during the workweek, the particular computing/storage device is not overloaded, and performance does not suffer.

This results in the peak workload on Monday (P5) being less than the calculated workload threshold for Monday (T5'), which may be calculated as T5'=Threshold(Max(P3, P4, P5))=T5, because P5 is the maximum or greatest peak workload from the present day (Monday) and two prior days (Sunday and Saturday). By preventing moving excessive data to the higher computing/storage device during downtime, the higher computing/storage device is not overloaded, and performance does not suffer.

Figure 7:
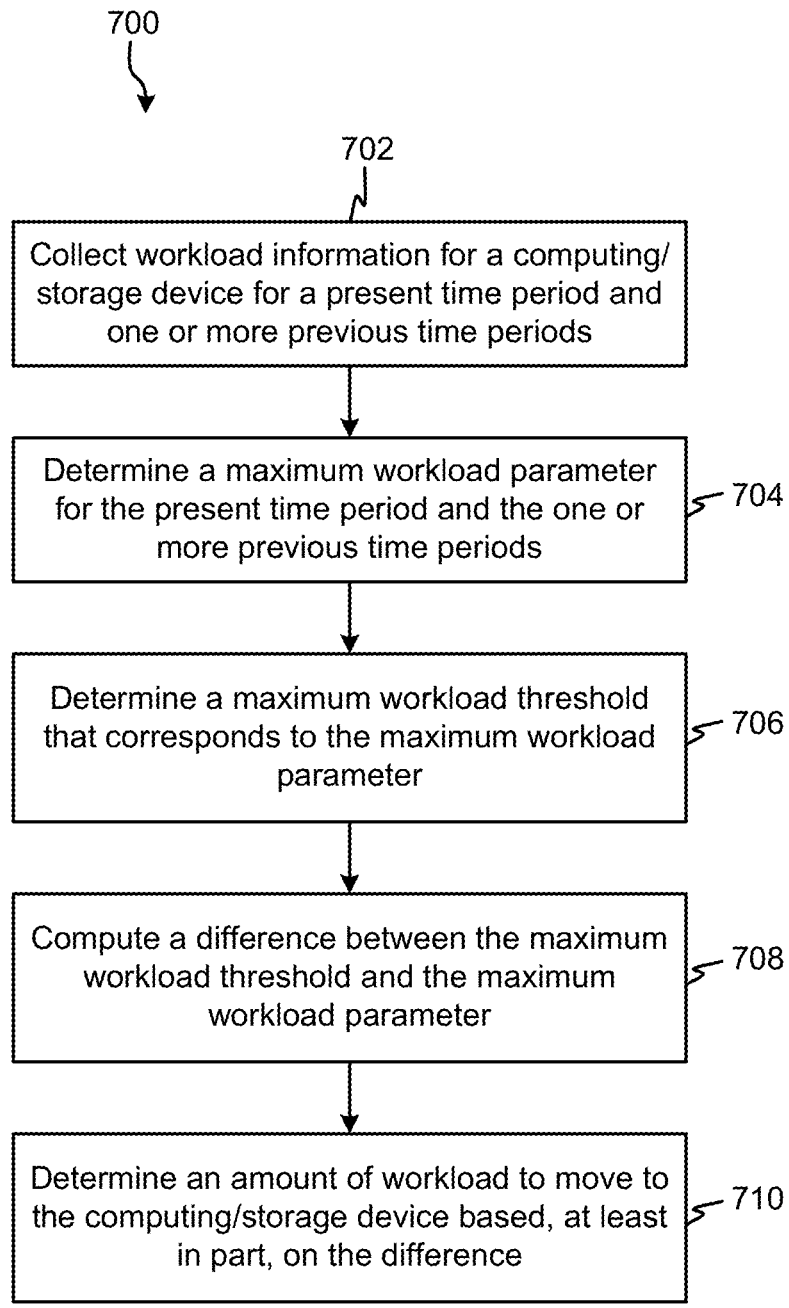
FIG. 7 shows a method for managing data, according to one embodiment.

Referring now to FIG. 7, a flowchart of a method 700 for managing data is shown according to one embodiment. Method 700 may be executed in any desired environment, including those shown in FIGS. 1-6, among others. Furthermore, more or less operations than those specifically described in FIG. 7 may be included in method 700.

In operation 702, workload information is collected for a computing/storage device for a present time period and one or more previous time periods. The computing/storage device may comprise at least one of: random access memory (RAM), a direct access storage device (DASD), an array of DASDs, and a redundant array of independent disks (RAID). In one embodiment, the DASD may be a HDD, a SSD, or some other storage device known in the art.

In one embodiment, the time period may be one day or some multiple of one day, such as two days, five days, seven days, 10 days, 30 days, etc.

In another embodiment, the one or more previous time periods may include at least two previous time periods, such as two, three, four, five, 10, etc., previous time periods. When the time period is one day, the one or more previous time periods may include at least two previous days. Additionally, the time period may be based on a data collection granularity of the system which is executing the method 700, in one approach, such that the shortest time period in which data may be collected and distributed may be used for the time period or as a fraction of the time period.

In operation 704, a maximum workload parameter is determined for the present time period and the one or more previous time periods.

In one embodiment, the workload information may comprise and/or be based at least partially on a bandwidth of data input and output (I/O) from the computing/storage device over a present and one or more previous time periods. In a further embodiment, the maximum workload parameter may comprise and/or be based at least partially on a peak bandwidth of the computing/storage device.

In operation 706, a maximum workload threshold that corresponds to the maximum workload parameter is determined. This maximum workload threshold may be calculated according to any calculation known in the art. For example, in various embodiments, the maximum workload threshold may be calculated based on a current or average maximum workload for a current and/or one or more previous time periods, a maximum of a workload threshold for a present or one or more previous time periods, a weighted average of a workload threshold for a present or one or more previous time periods, a multiplier of a peak bandwidth for a present or one or more previous time periods, etc.

In operation 708, a difference between the maximum workload threshold and the maximum workload parameter is computed. In one embodiment, this difference may be a simple subtraction calculation of the maximum workload parameter from the maximum workload threshold. Accordingly, this value may be positive or negative, and the greater the absolute value, the greater the difference is between the threshold and the perceived workload.

In operation 710, an amount of workload to move to the computing/storage device is determined based, at least in part, on the difference that is computed in operation 708.

In one embodiment, the amount of workload moved to the computing/storage device may be greater when the difference is greater than the amount of workload moved to the computing/storage device when the difference is less. That is to say, when the value is positive, the more available capacity that is determined to be on the particular computing/storage device, the more workload is moved to that computing/storage device in order to more efficiently utilize the capacity of the device.

In one approach, the method may be repeated after each time period, thereby ensuring that the amount of workload moved is consistent with a peak bandwidth for the present and one or more previous time periods, to ensure the computing/storage device is not overloaded or overdriven due to one or more downtime time periods.

The method 700 may be executed individually or in combination in a system, device, apparatus, and/or computer program product utilizing a computer readable storage medium, according to various embodiments.

The system may include logic (hard and/or soft) that is implemented in a processor, of any type known in the art. The logic may be encompassed by the processor, accessible to the processor, and/or stored to memory that the processor accesses to perform the functionality dictated by the logic, according to various embodiments.

Figure 8:
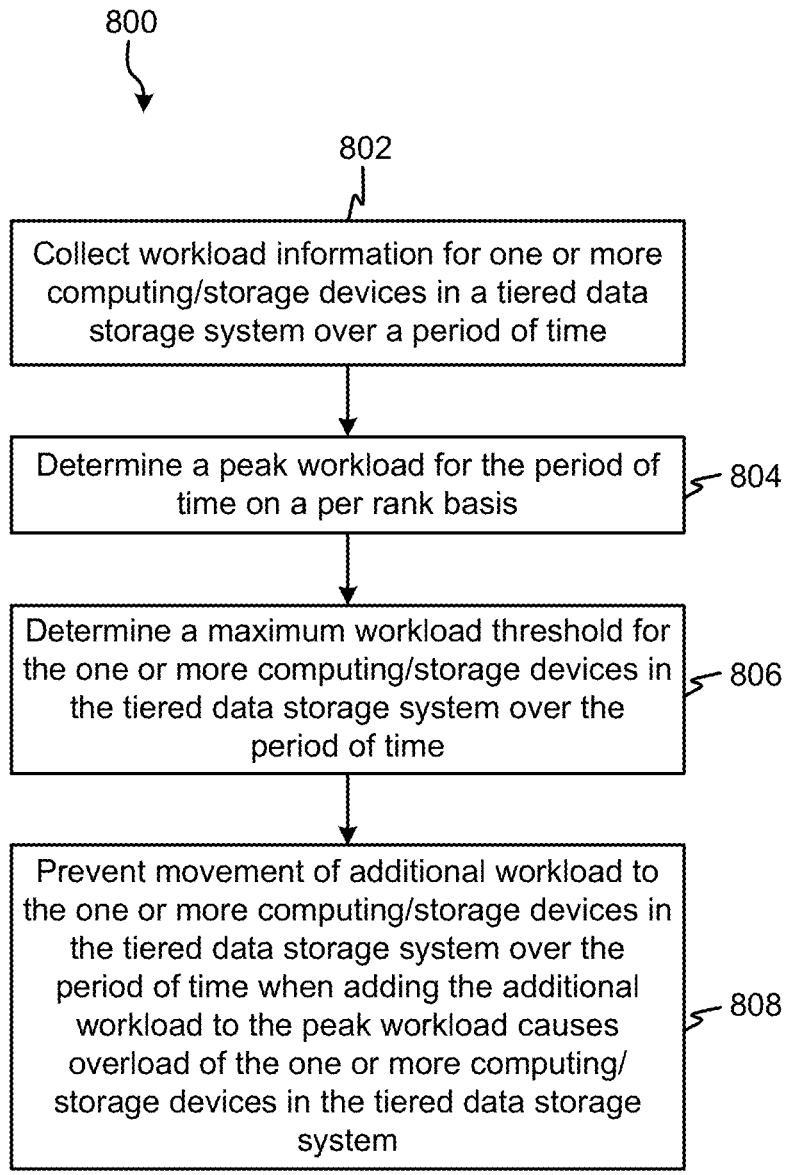
FIG. 8 shows a method for managing data, according to another embodiment.

Referring now to FIG. 8, a flowchart of a method 800 for managing data is shown according to one embodiment. Method 800 may be executed in any desired environment, including those shown in FIGS. 1-6, among others. Furthermore, more or less operations than those specifically described in FIG. 8 may be included in method 800.

In operation 802, workload information is collected for one or more computing/storage devices in a tiered data storage system over a period of time. The computing/storage device may comprise at least one of: random access memory (RAM), a direct access storage device (DASD), an array of DASDs, and a redundant array of independent disks (RAID). In one embodiment, the DASD may be a HDD, a SSD, or some other storage device known in the art.

This collection of workload information may be made on a per rank basis, per tier basis, for each of the one or more computing/storage devices individually and/or in combination.

In one embodiment, the period of time may be one day or some multiple of one day, such as at least three days, five days, seven days, 10 days, 30 days, etc.

In another embodiment, the period of time may include and/or encompass a cyclical workload pattern for the tiered data storage system. The cyclical workload pattern is defined by observable and cyclical reduction of workload (downtime), followed by and preceded by normal operating dynamics (uptime). Therefore, for the period of time to encompass and/or comprise the cyclical workload pattern, it should include at least one normal operating measurement, along with however many downtime measurements are included in the cyclical workload pattern. For example, for a cyclical workload pattern associated with weekends, the cyclical workload pattern would show downtime for two days over the weekend, preceded by a normal workload on Friday, and a normal workload on Monday. Therefore, to encompass the weekend cyclical workload pattern, either Monday or Friday should be included with the workload calculations for Saturday and Sunday.

According to another embodiment, the workload information may comprise and/or be based at least partially on a bandwidth of data input and output (I/O) from the one or more computing/storage devices, individually or in combination, over the period of time.

In operation 804, a peak workload is determined for the period of time on a per rank basis. What is meant by a per rank basis is that the peak workload is determined for each tier, division, separation, and/or type of storage. The more granular the peak workload is tracked, the more accurate and sophisticated the monitoring mechanism may be to ensure that one or more of the computing/storage devices do not become overloaded due to movement of workload during downtime(s).

In one embodiment, the peak workload may comprise and/or be based at least partially on a peak bandwidth of the one or more computing/storage devices, individually or in combination.

This determination may be made on a per rank basis, per tier basis, for each of the one or more computing/storage devices individually and/or in combination.

In operation 806, a maximum workload threshold for the one or more computing/storage devices in the tiered data storage system is determined over the period of time. This maximum workload threshold may be calculated according to any calculation known in the art. For example, in various embodiments, the maximum workload threshold may be calculated based on a current maximum workload, an average of one or more previous workload thresholds, a maximum of a workload threshold for a present or one or more previous time periods, a weighted average of a workload threshold for a present or one or more previous time periods, a multiplier of a peak bandwidth for a present or one or more previous time periods, etc.

This determination may be made on a per rank basis, per tier basis, for each of the one or more computing/storage devices individually and/or in combination.

In operation 808, movement of additional workload to the one or more computing/storage devices in the tiered data storage system is prevented, mitigated, and/or lessened over the period of time when adding the additional workload to the peak workload would cause overload of the one or more computing/storage devices in the tiered data storage system.

This determination may be made on a per rank basis, per tier basis, for each of the one or more computing/storage devices individually and/or in combination.

In one embodiment, a difference between the peak workload and the maximum workload threshold is computed. In one embodiment, this difference may be a simple subtraction calculation of the peak workload from the maximum workload threshold. The greater the absolute value, the greater the difference is between the threshold and the perceived workload.

In another embodiment, an amount of workload to move to the one or more computing/storage devices in the tiered data storage system is determined based, at least in part, on the computed difference.

In one embodiment, the amount of workload moved to the computing/storage device may be greater when the difference is greater than the amount of workload moved to the computing/storage device when the difference is less. That is to say, when the value is positive, the more available capacity that is determined to be on the particular computing/storage device, the more workload is moved to that computing/storage device in order to more efficiently utilize the capacity of the device.

In one approach, the method may be repeated after each period of time, such as once every day, thereby ensuring that the amount of workload moved is consistent with a peak bandwidth for the one or more computing/storage devices over the period of time, to ensure the one or more computing/storage devices is/are not overloaded or overdriven due to one or more downtimes.

The method 800 may be executed individually or in combination in a system, device, apparatus, and/or computer program product utilizing a computer readable storage medium, according to various embodiments.

The system may include logic (hard and/or soft) that is implemented in a processor, of any type known in the art. The logic may be encompassed by the processor, accessible to the processor, and/or stored to memory that the processor accesses to perform the functionality dictated by the logic, according to various embodiments.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Moreover, a system according to various embodiments may include a processor and logic integrated with and/or executable by the processor, the logic being configured to perform one or more of the process steps recited herein. By integrated with, what is meant is that the processor has logic embedded therewith as hardware logic, such as an ASIC, a FPGA, etc. By executable by the processor, what is meant is that the logic is hardware logic, software logic such as firmware, operating system, etc., or some combination of hardware and software logic that is accessible by the processor and configured to cause the processor to perform some functionality upon execution by the processor. Software logic may be stored on local and/or remote memory of any memory type, as known in the art. Any processor known in the art may be used, such as a software processor module and/or a hardware processor such as an ASIC, a FPGA, a CPU, an integrated circuit (IC), etc.

It will be clear that the various features of the foregoing systems and/or methodologies may be combined in any way, creating a plurality of combinations from the descriptions presented above.

It will be further appreciated that embodiments of the present invention may be provided in the form of a service deployed on behalf of a customer to offer service on demand.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method for managing data, the method comprising:
   collecting workload information for a data storage device in a data storage system over a period of time;
   determining a peak workload of the data storage device for the period of time;
   determining a maximum workload threshold for the data storage device in the data storage system over the period of time; and
   preventing movement of additional workload to the data storage device in the data storage system during a subsequent period of time when the data storage device is predicted to be at the peak workload for the data storage device in response to a determination that adding the additional workload would cause the workload of the data storage device to exceed the maximum workload threshold.

2. The method as recited in claim 1, comprising determining an amount of workload to move to the data storage device in the data storage system based on a difference between the maximum workload threshold and the peak workload, and moving about the determined amount of workload to the data storage device, wherein the amount of workload moved to the data storage device is less than or equal to the difference.

3. The method as recited in claim 1, wherein the period of time encompasses a cyclical workload pattern for the data storage system, wherein the period of time is at least 3 days.

4. The method as recited in claim 1, wherein the additional workload is prevented from being moved to the data storage device in response to a determination that the difference between the maximum workload threshold and the peak workload is less than the additional workload.

5. The method as recited in claim 1, wherein the data storage device is selected from the group consisting of: a hard disk drive, a solid state drive, a sequential access media drive, and a direct access media drive.

6. The method as recited in claim 1, wherein the workload information comprises a bandwidth of data input and output from the data storage device, and wherein the peak workload is a peak bandwidth of the data storage device.

7. The method as recited in claim 1, wherein the determining the peak workload for the period of time, the determining the maximum workload threshold, and the preventing movement of the additional workload is performed for each of a plurality of data storage devices of the data storage system individually.

8. The method as recited in claim 1, wherein the method is performed once per day.

9. A system, comprising a processor and logic integrated with and/or executable by the processor, the logic being configured to cause the processor to:
   collect, by the processor, workload information for a data storage device in a data storage system over a period of time;
   determine, by the processor, a peak workload of the data storage device for the period of time;
   determine, by the processor, a maximum workload threshold for the data storage device in the data storage system over the period of time;
   determine, by the processor, that a sum of additional workload plus the peak workload exceeds the maximum workload threshold of the data storage device; and
   prevent, by the processor, movement of the additional workload to the data storage device in the data storage system in response to the determination that the sum exceeds the maximum workload threshold.

10. The system as recited in claim 9, comprising logic for: determining an amount of workload to move to the data storage device in the data storage system based on a difference between the maximum workload threshold and the peak workload, and moving the determined amount of workload to the data storage device.

11. The system as recited in claim 9, wherein the period of time encompasses a cyclical workload pattern for the data storage system.

12. The system as recited in claim 9, wherein the additional workload is prevented from being moved to the data storage device in response to a determination that the difference between the maximum workload threshold and the peak workload is less than the additional workload.

13. The system as recited in claim 9, wherein the data storage device is selected from the group consisting of: a hard disk drive, a solid state drive, a sequential access media drive, and a direct access media drive.

14. The system as recited in claim 9, wherein the workload information comprises a bandwidth of data input and output from the data storage device, and wherein the peak workload is a peak bandwidth of the data storage device.

15. The system as recited in claim 9, wherein the determining the peak workload for the period of time, the determining the maximum workload threshold, and the preventing movement of the additional workload is performed for each of a plurality of data storage devices of the data storage system individually.

16. The system as recited in claim 9, wherein the logic is configured to perform the operations once per day.

17. A computer program product for managing data, the computer program product comprising a computer readable storage medium having program code embodied therewith, the program code executable by a processor to cause the processor to perform a method comprising:
   collecting workload information for a data storage device in a data storage system over a period of time of at least three days;
   determining a peak workload of the data storage device for the period of time;
   determining a maximum workload threshold for the data storage device in the data storage system over the period of time;
   determining a difference between the maximum workload threshold and the peak workload for the period of time; and
   moving an amount of additional workload to the data storage device that is less than or equal to the difference.

18. The computer program product as recited in claim 17, wherein the amount of additional workload moved to the data storage device is equal to the difference.

19. The computer program product as recited in claim 17, wherein the period of time encompasses a cyclical workload pattern for the data storage system.

20. The computer program product as recited in claim 17, wherein the determining the peak workload for the period of time, the determining the maximum workload threshold, and the movement of the amount of additional workload is performed for each of a plurality of data storage devices of the data storage system individually.

* * * * *